INVENTOR
LYMAN H. WALBRIDGE

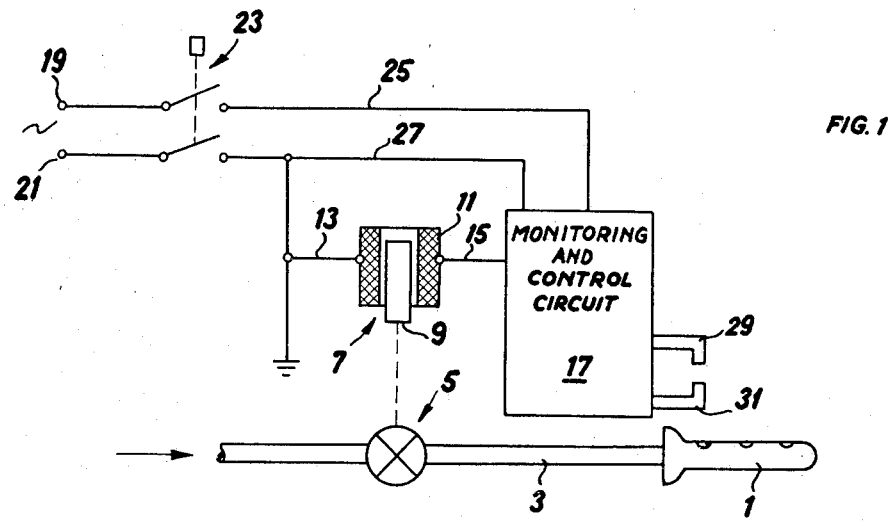
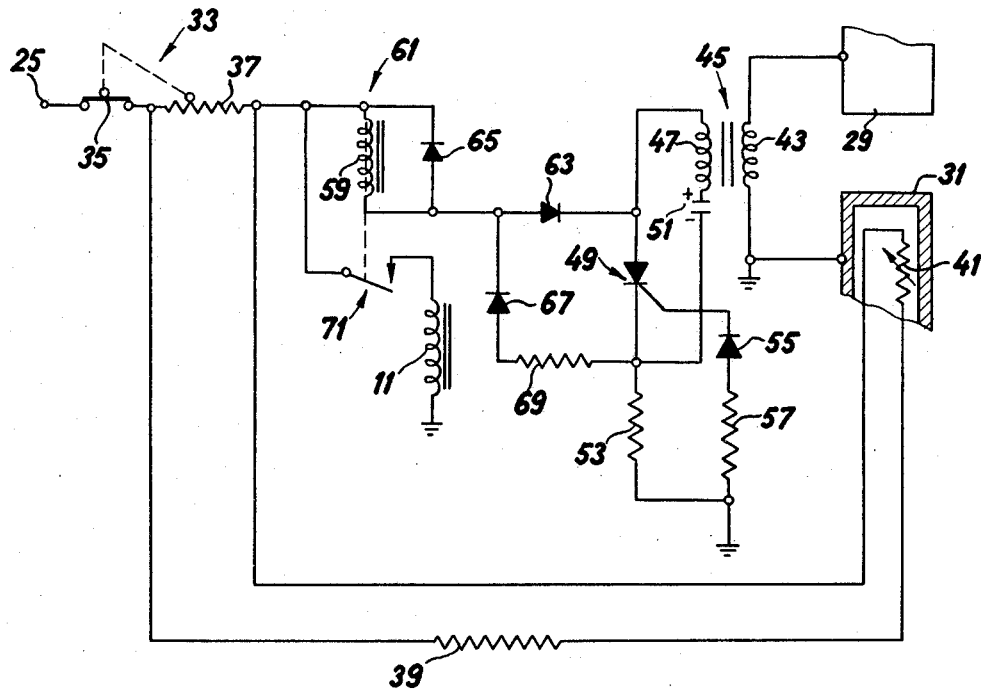

United States Patent Office 3,504,992
Patented Apr. 7, 1970

3,504,992
PULSED SPARK GAS IGNITION AND FLAME MONITORING SYSTEM
Lyman H. Walbridge, Ashland, Mass., assignor to Fenwal Incorporated, Ashland, Mass., a corporation of Massachusetts
Original application Apr. 5 1966, Ser. No. 540,333, now Patent No. 3,384,439. Divided and this application Feb. 14, 1968, Ser. No. 705,474
Int. Cl. F23n 5/02
U.S. Cl. 431—26           5 Claims

ABSTRACT OF THE DISCLOSURE

An ignition and fuel control system for gas burners including ignition electrodes, pulse generating means for applying spaced unipolar voltage pulses to said electrodes, a fuel supply valve, and means controlled by operation of the pulse generating means and by a flame detector for controlling the valve. The full specification should be consulted for an understanding of the invention.

---

This application is a division of my co-pending application Ser. No. 540,333, filed on Apr. 5, 1966, for Pulsed Spark Gas Ignition and Flame Monitoring System and now Patent No. 3,384,439.

My invention relates to electrical ignition systems, and particularly to a novel pulsed spark gas ignition and flame monitoring system.

A demand has developed for a modern ignition system for gas fired heating equipment such as stoves, industrial furnaces and the like, to replace the conventional pilot flame ignition system. Pilot flames are undesirable, because they frequently require adjustment and may be extinguished by drafts. To avoid these problems with the gas pilot flame, electrical systems have been proposed in which two spaced electrodes are located adjacent the gas outlet of a burner to produce sparks causing ignition independently of any draft that may be present. Such an ignition system is disclosed in my co-pending U.S. application Ser. No. 446,782, filed on Apr. 1, 1965, and now Patent No. 3,277,949, for Method and Apparatus for Hydrocarbon Ignition and Monitoring, which is assigned to the assignee of this application.

While the apparatus disclosed in my prior application is highly satisfactory for many purposes, its advantages for some of these purposes make it unsuitable for others. Specifically, a characteristic feature of that apparatus is the substantially continuous flow of alternating current between the ignition electrodes, which current is used both for ignition, and, as a measure of the presence of a flame. While flame is present, gas may be admitted to the burner. Because of the relatively low voltage provided by economically feasible apparatus of the type described, the ignition electrodes must be fairly closely spaced; the spacing of the electrodes then becomes critical, because a small change will cause a disproportionately large change in the impedance of the spark gap. Since the spacing of the electrodes is rather critical when close, for reasons of reliability it has become conventional to make the electrodes of brittle material that will break if any attempt is made to adjust the gap manually after the system has been installed. Thus, any changes in spacing that occur because of erosion or the like, require the replacement of the electrodes.

Close electrode spacing also allows an arc to continue in the absence of flame until the electrodes cool. This effect may be used to advantage for many installations in which it is desired to avoid nuisance failures caused by momentary interruptions of gas pressure. Following the momentary interruption the burner will reignite without requiring a complete recycling of the control system. However, in other installations, such as in large capacity gas burners and in burners in which the spark electrodes are used to monitor a small pilot flame controlling a very large main flame, or the like, it is vitally important to turn the gas supply off immediately (without an electrode cooling period) as soon as there is any indication of the extinction of the flame. Accordingly, the objects of my invention are to provide apparatus to facilitate the control of ignition and the safe control of gas flow in burners requiring rapid fuel shut-off in the event of extinction of the gas flame. A further object of my invention is to provide a novel pulse forming circuit, as will be hereinafter described.

Briefly, the ignition control and flame monitoring apparatus of my invention includes a pair of ignition electrodes that are relatively widely spaced, a pulsing circuit for periodically supplying pulses of high voltage and short duration to the electrodes, an electrically operated valve for admitting fuel to the region adjacent the electrodes, and a monitoring circuit for closing the valve when a condition indicating the absence of a flame is detected. Additionally, means are provided for preventing operation of the gas valve if the electrodes are short-circuited.

In accordance with a preferred embodiment of my invention, the pulsing circuit comprises a pulse transformer having a secondary winding connected across the electrodes, and a primary winding connected in series with a capacitor. Switching means are provided for controlling a source of alternating voltage to charge the capacitor on one half-cycle and to shunt it through the primary winding of the pulse transformer on the adjacent half-cycle. By this arrangement, spaced unidirectional pulses of high voltage and extremely short duration are produced to cause brief intense ignition sparks across the electrodes. Preferably, both the electrically operated gas supply valve and the pulsing circuit are supplied with energy by a common circuit in which a circuit breaker is connected. The circuit breaker is arranged to interrupt the circuit, and thus close the valve, if there is a malfunction in the pulsing circuit, or in the valve control circuit.

In accordance with a first embodiment of my invention, the flame monitoring means comprises a thermistor having a negative temperature characterisic and located either within one of the spark electrodes or in position to be bathed by a flame ignited by the electrodes. The thermistor is connected in parallel with the circuit breaker discussed above, so that when a flame is present and the impedance of the thermistor is correspondingly low, current will be diverted from the circuit breaker. In accordance with this embodiment, the circuit breaker is adjusted to break the circuit after a short period of normal operation, if the thermistor remains cold. A fixed resistor is connected in series with the thermistor, the values of the resistor and thermistor impedance being proportioned to secure the operation just described, so that in the event the thermistor is short circuited the circuit breaker will still function.

In accordance with a second embodiment of my invention, the flame monitoring circuit includes a relay having a winding connected in series with the pulsing circuit supply and having contacts which are closed when the relay is energized to thereby energize the electrical control circuit for the gas valve. The relay winding is shunted by an electronic switch controlled by the average current flowing through the spark electrodes. For this purpose, a capacitor is connected in series with the spark electrodes, and the voltage across the capacitor is employed to hold the switch closed when average current through the capacitor indicates that the electrodes are functioning properly. In this first embodiment of my invention, the pulsing circuit is preferably arranged to produce a high voltage initially causing ignition sparks before the gas valve is opened and shortly thereafter. Then the pulsing circuit produces lower voltage pulses that will maintain the gas valve in the open condition so long as a flame is present in the region adjacent the electrodes; however, the pulses are insufficient in amplitude to bridge the gap when the electrodes are not immersed in flame. Since consecutive sparks are separated by substantially a whole cycle of the alternating source voltage, and the average current flow is small, the electrode gap cools very rapidly when the flame is extinguished. Accordingly, when the flame is extinguished the relay whose operation causes the gas valve to open is immediately shunted to disconnect the valve and permit it to close.

The construction and mode of operation of the apparatus of my invention, as well as further objects and advantages thereof, will be apparent from the following detailed description, together with the accompanying drawings, of various preferred embodiments thereof.

In the drawings:

FIG. 1 is a schematic diagram of an ignition control system in accordance with my invention;

FIG. 2 is a schematic wiring diagram of a first embodiment of a control circuit suitable for use in the system of FIG. 1, with parts shown in cross-section and parts broken away;

Figure 3:
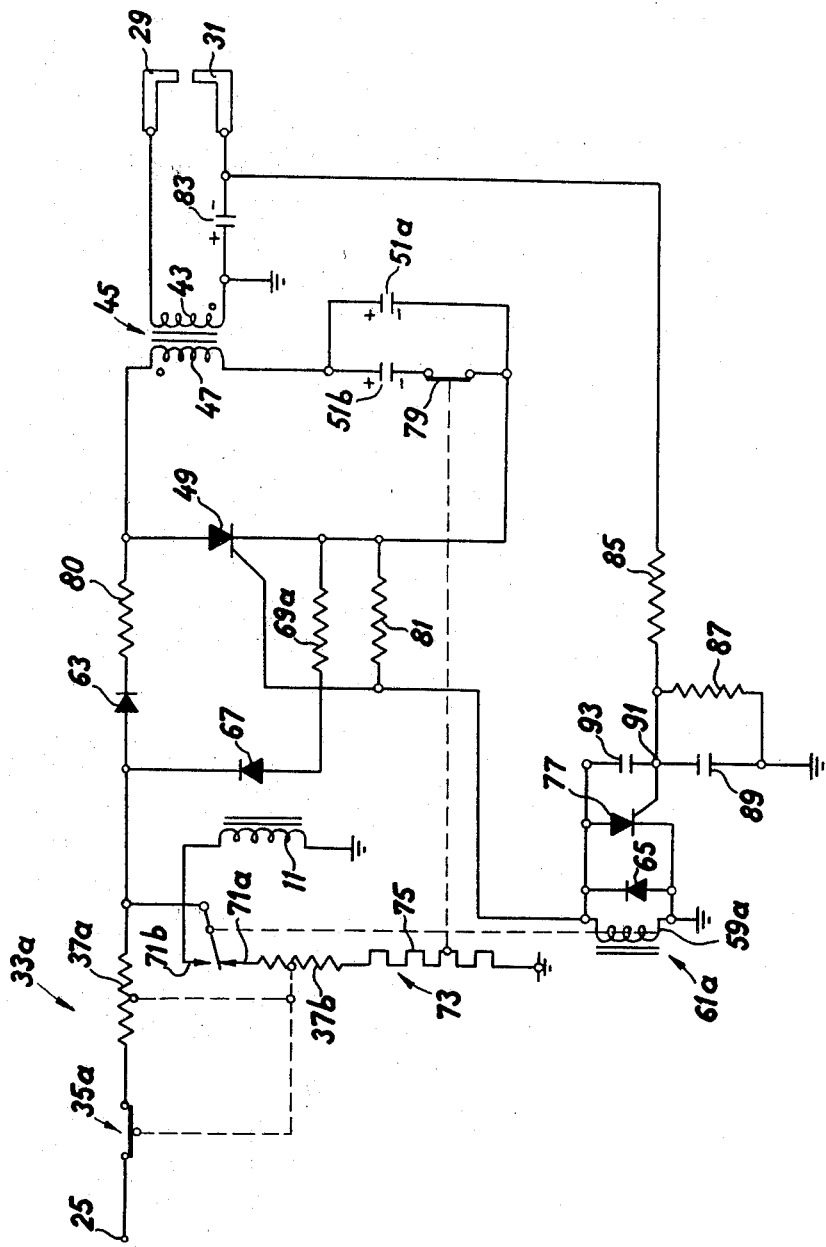
FIG. 3 is a schematic wiring diagram of a second embodiment of a control circuit suitable for use in the system of FIG. 1.

In FIG. 1, I have shown an ignition control system for a gas burner 1 arranged to be supplied with gas by a gas supply line 3 under the control of an electrically operated valve generally designated as 5. The valve 5 may be of the type normally closed by a spring and arranged to be opened by the actuation of a solenoid generally designated as 7. The solenoid 7 includes an armature 9, connected to the valve body, and a winding 11. The terminals 13 and 15 of the winding 11 are connected between ground and a control circuit 17, to be described. Input terminals 25 and 27 of the control circuit 17 are connected to the terminals 19 and 21 of a source of alternating voltage, when a switch 23 is closed. The switch 23 may be manually actuated, as schematically indicated, or it may be under the control of a thermostat or the like.

The monitoring and control circuit 17 operates in a manner to be described to periodically provide spaced pulses of high voltage to a pair of ignition electrodes 29 and 31. These pulses are of peak magnitudes on the order of 20,000 volts or more, and electrodes 29 and 31 are spaced correspondingly far apart, so that minor changes in spacing due to the tolerances inherent in assembly or due to gradual erosion of the electrode surfaces are not critical. The duration of the ignition pulses is preferably of the order of one microsecond. The electrodes 29 and 31 are arranged to be bathed by the flame produced by the burner 1 when fuel is ignited, and thereby conduct more readily because of ions produced by the temperature of the flame. As will appear, the control circuit 17 is arranged to open the valve 5 only when ignition sparks have been established across the electrodes 29 and 31, and to close the valve 5 at any time that the flame produced by the burner 1 is extinguished or the electrodes 29 and 31 are short-circuited.

In FIG. 2, I have shown a specific embodiment of the control circuit 17 of FIG. 1. In FIG. 2, parts corresponding to those shown in FIG. 1 are given corresponding reference numerals. As shown, the input supply terminal 25 of the control circuit is connected to the rest of the apparatus through a circuit breaker generally designated as 33, which includes the contacts 35 and a current responsive impedance 37 connected in series. The circuit breaker 33 may be either the electromagnetic type or the thermally responsive resistance type, but as here shown is of the resistance type.

The resistive element 37 of the circuit breaker 33 is shunted by a resistor 39 in series with a thermistor 41. The thermistor 41 is preferably of the tin oxide type, and has a negative temperature characteristic such that when heated to about 1800° F. will exhibit a resistance of about 15 ohms, increasing as the temperature is reduced, to above 100,000 ohms at 70° F.

As shown, the thermistor 41 may be physically located within one of the electrodes 29 and 31, and preferably within the electrode 31 that is grounded. Alternatively, the thermistor 41 may be located outside of the electrode 31, in any position where it will respond to the temperature of the flame.

The electrodes 29 and 31 are connected across the secondary winding 43 of a pulse transformer generally indicated as 45. The primary winding 47 of the pulse transformer 45 is connected at one end to the anode of a silicon controlled rectifier 49, and at the other end to the cathode of the controlled rectifier through a capacitor 51.

The cathode of the controlled rectifier 49 is connected to ground through a resistor 53, and the gate terminal of the controlled rectifier 49 is connected to ground through a diode 55 and a resistor 57 in series.

Current for charging the capacitor 51 is at times supplied over a circuit path extending from the input terminal 25 over the contacts 35 and the impedance 37 of the circuit breaker 33, through the winding 59 of the relay generally designated 61, the diode 63, the primary winding 47 of the pulse transformer 45, to the capacitor 51, and then to ground through the resistor 53. Current can flow in this path only during half-cycles of the source voltage in which the terminal 25 is positive with respect to ground. Current will flow in this path when the voltage on terminal 25 is greater than the charge on capacitor 51. Current in this path (other than leakage current) depends on the periodic discharge of the capacitor 51 by the silicon-controlled rectifier 49 as will be described below. It should be noted that this path includes both apparatus for detecting over currents, i.e., the circuit breaker 33 and for detecting sub-normal currents, i.e., the relay 61. Relay 61 will not close and energize the winding 11 of the gas valve if the current in this path is below an acceptable magnitude. The purpose of this arrangement is to establish a normal current zone. For current in the charging path above and below the normal zone, the valve 5 cannot remain open.

During half-cycles of the source voltage when the terminal 25 is negative with respect to ground, current flows in a circuit including the circuit breaker 33, the diode 65 connected across the winding 59 of the relay 61, the diode 67, a resistor 69, and the resistor 53.

Current in this circuit provides a voltage drop across the resistor 53 in a direction to make the cathode of the silicon-controlled rectifier 49 negative with respect to the gate. Current therefore flows in the gate circuit in a direction to cause triggering and conduction of the silicon-controlled rectifier. I have shown a resistor 69 connecting the cathode of silicon-controlled rectifier 49 and diode 67. In some instances it may be desirable to use a resistance-capacitance network in place of the single resistance in order to cause the silicon-controlled rectifier to trigger at a desired time during the negative half-cycle of the source voltage.

The winding 11 of the solenoid 7 of FIG. 2 is at times supplied with energizing current flowing between the input terminal 25 and ground in either direction over a circuit including the circuit breaker 33 and contacts 71 of the relay 61. The contacts 71 are closed when the relay is energized. As a measure of economy in circuits which do not require the protection afforded by the inclusion of the relay 61, this relay and the diode 65 may be omitted, and the contacts 71 replaced by a closed path. However, the relay 61 does assure that the capacitor discharge circuit is operating normally by sensing below normal currents, as described above, thus assuring a means of ignition before the valve is opened.

The circuit breaker 33 is selected in conjunction with the values of the resistor 39 and of the resistance range of the thermistor 41 such that when there is no flame and the thermistor 41 is below flame temperature, the circuit breaker contacts 35 will be opened a short period of time after power is applied thereto.

If the thermistor 41 becomes shorted, the resistor 39 is selected to protect the integrity of the circuit breaker to the extent that overload currents will still cause operation of the circuit breaker. However, with the system operating normally and the electrodes 29 and 31 bathed in flame, the sum of the resistances of the thermistor 41 and the fixed resistor 39 are selected to divert sufficient current from the impedance 37 of the circuit breaker 33 to prevent it from operating.

The operation of the circuit shown in FIG. 2 will next be described, on the assumption that the switch 23 in FIG. 1 is closed, the thermistor 41 is cold, and the solenoid 11 is deenergized. Assuming first a half-cycle during which the terminal 25 is positive with respect to ground, charging current flows through the circuit breaker 33, the winding 59 of the relay 61, the diode 63, the primary winding 47 of the pulse transformer 45, the capacitor 51, and to ground through the resistor 53. During this half-cycle although the anode of the silicon-controlled rectifier 49 is positive with respect to its cathode, it will not conduct because no current is supplied to its gate terminal. The relay 61 is energized, its contacts 71 close and current is then supplied to the solenoid 11. The valve 5 in FIG. 1 will begin to open.

On the next succeeding half-cycle, during which the terminal 25 is negative with respect to ground, current will flow in the path including the diodes 65 and 67 and the resistors 69 and 53. The cathode of the silicon-controlled rectifier 49 will then be negative with respect to its gate terminal, gate current will flow from ground through the resistor 57 and the diode 55. The silicon-controlled rectifier is triggered into conduction, and the capacitor 51, charged during the previous half-cycle, is abruptly discharged through the primary winding 47 of the pulse transformer 45. A high intensity pulse of voltage will appear across the secondary winding 43, causing a spark to occur between the electrodes 29 and 31. Following the abrupt discharge of the capacitor 51, the anode voltage of the silicon-controlled rectifier is so low that it extinguishes.

In the circuit illustrated, the relative size of the resistors 69 and 53 will determine the time in the negative half-cycle of the source voltage when the silicon-controlled rectifier 49 triggers. As noted above this time can also be determined by using a resistance capacitance network of known design for the resistor 69. Such circuits, which control the "firing-angle" of the silicon-controlled rectifier are known and will not be described in detail.

Operation will continue in succeeding cycles in the manner described for the first cycle, with an ignition spark being produced every cycle of the source voltage. Meanwhile, the resistive element 37 of the circuit breaker 33 will be heating, and if ignition does not take place, the contacts 35 will be opened after a short period. If ignition does take place, however, a flame will bathe the electrodes 29 and 31 and the thermistor 41 will be heated, diverting enough current around the resistance 37 of the circuit breaker to prevent its operation. Should the flame go out, the electrodes and the thermistor 41 will cool quickly, and the circuit breaker 33 will operate to disconnect the solenoid 11, allowing the valve 5 in FIG. 1 to close.

It will be apparent from the foregoing description that the monitoring and control circuit of my invention, as described above includes a novel pulse-forming circuit. This novel pulse-forming circuit includes the current-responsive circuit breaker 33, the diode 63, the silicon-controlled rectifier 49, the pulse transformer 45, capacitor 51, resistors 53, 57 and 69 and diodes 55 and 67, all connected as shown in FIG. 2 and operating in the manner described.

Among the advantages of this novel circuit is that it will only operate if the silicon-controlled rectifier is operating satisfactorily, i.e., it "proves" that the silicon-controlled rectifier has not failed. Silicon-controlled rectifiers normally fail by short-circuiting. If this should occur, then during the next positive half-cycle of applied voltage, the circuit breaker 33 will open, thus disabling the circuit and preventing any undesired sparking at the output terminals. As described above, the firing time of the silicon-controlled rectifier 49 during the negative half-cycle of applied voltage may be readily controlled by adjustment of the relative size of resistors 69 and 53 as well as the size of any capacitor included in parallel with the resistor 69.

While I have described this first embodiment of my invention as using a thermistor, it will of course be understood that a thermally-sensing switch which is normally open at ambient temperatures and is closed by the high temperatures resulting from a gas flame may be used in place of the thermistor, and the use of such a switch is within the contemplation of my invention.

In FIG. 3 I have shown an alternative form of control circuit 17 for use in the apparatus of FIG. 1. In FIG. 3, parts identical with those shown in FIG. 2 are given the same reference numerals, parts performing similar functions but modified in some respects are given the same numerals with an identifying suffix, and elements not previously shown are given new reference characters.

In this embodiment a means for detecting the presence of flame by electrical conduction of the flame itself between the electrodes which form the spark gap is used to prove the flame. An additional timing means is also provided to better utilize the rapid response that flame conduction detection provides.

Energy for the apparatus of FIG. 3 is supplied between the input terminal 25 and ground as before, and a circuit breaker 33a is connected in series with the input terminal 25. The circuit breaker 33a is provided with two resistance elements, 37a and 37b. The resistance element 37a is in the circuit at all times, while the resistance element 37b is only in the circuit in the preignition state of the apparatus. The two impedances are selected in a conventional manner to cause operation of the circuit breaker contacts 35a in response to overload currents flowing to the different loads seen by the supply terminal in the preignition state and in the later ignition and flame monitoring states of the apparatus. In this embodiment of my invention, the circuit breaker is arranged to trip rapidly in response to an overload in any state of operation of the apparatus.

In the embodiment of my invention shown in FIG. 3, the electrodes are widely spaced and the voltage pulses applied during normal operation are not sufficient to spark across the space between the electrodes. Accordingly, to provide ignition before the inter-electrode space is ionized by flame, I provide means for increasing the voltage during an ignition period applied to the electrodes prior to the introduction of gas into the combustion chamber, so that sparks may be produced even though the interelectrode space has not been ionized by flame. After ignition, the voltage of the pulses is decreased to a value which will not produce sparks when the inter-electrode space is not ionized. For this purpose, I provide a thermal time delay relay generally indicated at 73 having a resistive heating element 75 arranged to open a contact 79 after a predetermined delay, and to keep the contact open for a brief interval after heating current has ceased to flow through the heating element 75 of the relay.

A circuit for energizing the heating element 75 of the relay 73 extends from the input terminal 25 through the contacts 35a of the circuit breaker 33a, through the impedance element 37a of the circuit breaker 33a, through the back contact 71a of the relay 61a (closed when the relay is deenergized), and through the impedance element 37b of the circuit breaker 33a and the impedance element 75 to ground.

The relay 61a has a winding 59a shunted by a diode 65 to prevent a negative potential from appearing across the relay and the electronic switch 77 in parallel therewith. The silicon-controlled switch is a four layer semi-conductor device that is schematically similar to a controlled rectifier but is more sensitive to low level signals. Limited reverse blocking ability may prevent the silicon-controlled switch from qualifying as a rectifier. The controlled switch 77 has its anode connected to one terminal of the winding 59a and its cathode connected to the other terminal. When the silicon controlled switch 77 is in its non-conducting state, current for energizing the winding 59a of the relay 61a is supplied during half-cycles when the terminal 25 is positive with respect to ground through a circuit which includes the contacts 35a and the impedance element 37a of the circuit breaker 33a, the diode 63, the resistance 80, the primary winding 47 of the pulse transformer 45, the capacitor 51a (in parallel with a capacitor 51b if the contact 79 of the relay 73 is closed), the resistance 81, and through the winding of the relay 59a to ground. Conduction through this path also serves to charge the capacitor 51a (and to charge the capacitor 51b at times when the contacts 79 are closed).

During half-cycles in which the terminal 25 is negative with respect to ground, current flows through the diode 67, the resistor 69a, the resistor 81, and the diode 65 from ground. It will be apparent that while this latter current is flowing, the gate terminal of the silicon-controlled rectifier 49 will conduct current to cause the controlled rectifier 49 to trigger and discharge the capacitor 51a (and the capacitor 51b if it is in circuit), through the primary winding of the pulse transformer 45. The abrupt discharge of the capacitor or capacitors will cause a high voltage pulse to appear across the secondary winding 43 of the transformer 45. The pulse will have a maximum peak voltage that is higher if the capacitor 51b is not in circuit.

When the relay 61a is energized, its front contact 71b is closed, completing a circuit for the energization of the valve solenoid winding 11. The relay 61a will be energized to allow the valve 5 in FIG. 1 to open only after the production of ignition sparks has commenced.

Capacitor 83 is connected in series with the electrodes 29 and 31 and the secondary winding 43 of the pulse transformer 45. The polarities of the primary and secondary windings of the transformer 45 are as indicated by the dots, and the unidirectional pulses of voltage across the primary winding 47 produced by discharge of capacitor 51a, alone or in combination with the capacitor 51b, produce unidirectional pulses across the secondary winding 43 serving to charge the capacitor 83 in the sense illustrated by the polarity markings on the drawing. As illustrated, one side of the capacitor 83 is grounded, and the side which is negative when the capacitor is charged by sparking current is connected to ground through a resistor 85 and a resistor 87 in series.

The capacitors 89 and 93 form a capacitive voltage divider to provide a positive gate signal to the silicon-controlled switch 77 on terminal 91 during the portion of the positive half-cycles of the source voltage when the voltage is increasing. This positive gate signal will trigger the silicon-controlled switch and shunt the winding 59a of relay 61a, thus closing the gas valve, unless there is also a negative potential supplied to the terminal 91 as a result of sparking current flowing through capacitor 83. In order to prevent conduction of the switch 77, the charge stored on the capacitor 83 by conduction as a result of sparking between electrodes 29 and 31 during the preceding negative half-cycle must be sufficient to provide a voltage on the terminal 91 such that the positive voltage supplied during the positive half-cycle after sparking by the capacitor voltage divider is not sufficient to cause the switch 77 to trigger.

The component values in the circuit are selected so that the switch 77 will not conduct when and only when the electrodes are conducting consecutive pulses of current which can only be produced by the repetitive discharge of the capacitors 51a and 51b in parallel or of capacitor 51a.

The operation of the embodiment of FIG. 3 will be described assuming that alternating current is applied between the input terminal 25 and ground, and that the relay 61a is de-energized. Current flows initially through the contacts 35a of the circuit breaker 33a, the impedance element 37a of the circuit breaker, back contacts 71a of the relay 61a, the resistance element 37b of the circuit breaker, and through the resistance element 75 of the thermal relay 73. The capacitors 51a and 51b will be charged on each positive half-cycle of current at this time, and discharged on succeeding negative half-cycles with respect to ground by gating of the silicon-controlled rectifier 49. However, initially, no sparks will occur across the electrodes 29 and 31 because the voltage to which the capacitors 51a and 51b are charged in parallel is not sufficient to cause an arc when the capacitors are discharged in the absence of a flame bathing the electrodes.

The relay 61a would normally close when energized by the repeated charging current of the storage capacitors 51a and 51b. However, the silicon-controlled switch 77 connected across the terminals of relay 61a is gated into conduction early in the positive half-cycle by the capacitive voltage divider formed by capacitors 89 and 93. This delay prior to ignition may be of short duration or may amount to a substantial "pre-purge time" depending on the particular application and on the particular timing means. "Pre-purge time" is a term generally used in the gas industry and refers to a delay between the time that the system is energized and the time that the gas supply valve is opened. This interval is useful for purging areas of combustible mixtures and in making preliminary checks to insure safe start or operation of some burners and controls. For example, if the supply valve did open before the timer ended the pre-purge period provision could be made to shut down the whole system.

When the heating element 75 of the relay 73 causes the contact 79 of the relay to open, the capacitor 51b will be disconnected. In the next succeeding positive half-cycle, the capacitor 51a will be charged to a higher voltage through the circuit including the diode 63, the resistance 80, the primary winding 47 of the pulse transformer 45, the capacitor, the resistor 81, and the winding 59a of the relay 61a. The relay 61a will still be deenergized at this time, as no current has yet flowed through the electrodes 29 and 31 to charge the current-sensing capacitor 83 and bias off the silicon-controlled switch 77. Accordingly, the switch 77 will be conducting, and no appreciable current will flow through the relay coil 59a, thus preventing operation of the gas supply valve.

On the next succeeding half-cycle in which the terminal 25 is negative with respect to ground, the charge stored in the capacitor 51a will be discharged through the primary winding 47 of the transformer 45. The silicon-controlled rectifier 49 will be gated on at this time, because current flowing through the resistor 81 will make the gate terminal positive with respect to the cathode. A high voltage pulse will be produced across the secondary winding 43, causing sparking between the electrodes 29 and 31 and current to flow, thereby charging the capacitor 83. During this negative half-cycle, the winding 59a of the relay 61a will be shunted by the diode 65. During a subsequent positive half-cycle, after a series of negative going pulses have charged capacitor 83, the terminal 91 will be negative with respect to ground and the silicon-controlled switch 77 will be rendered non-conducting. Current will then flow through the winding 59a of the relay 61a, causing its front contact 71b to close. The solenoid winding 11 will be energized, and the valve 5 in FIG. 1 will be opened. The contact 79 of the thermal relay 73 will remain open for a brief interval, allowing additional high intensity sparks to be produced as gas is admitted to the burner. After a number of such ignition sparks determined by the timing means 75, the contact 79 will be closed as it was initially, thus connecting the capacitor 51b in parallel with the capacitor 51a. Sparks will continue to be produced by discharge of the capacitors 51a and 51b only if ignition has been established and the electrodes are bathed in flame causing ionization that will support a discharge at the lower voltage produced by the discharge of the capacitors 51a and 51b. If ignition is not achieved before capacitor 51b is re-connected, the bias voltage will soon leak off capacitors 83 and 89 through resistors 85 and 87 causing the silicon-controlled switch 77 to shunt relay 61a, thereby opening the gas valve and re-energizing the timing means 75. Thus another pre-purge time will begin followed by another trial for ignition. With each such cycle, heat from resistors 37a and 37b raises the temperature of the thermal circuit breaker 33a to limit the permissible number of tries for ignition. As long as the flame is maintained, the relay 59a will be energized by alternate pulses of current during half-cycles in which the terminal 25 is positive with respect to ground by action of the voltage across the capacitor 83 holding the silicon-controlled switch 77 out of conduction. However, should the flame be extinguished, the inter-electrode space will be deionized, no further sparks will be produced, and the potential of the terminal 91 will go positive with respect to ground due to the voltage divider action of the capacitors 89 and 93, and the relay 61a will be deenergized, thus shutting off the flow of gas.

As described, the system of FIG. 3 will re-cycle once or a number of times according to the limits set by the thermal relay 73 and the thermal circuit breaker 33a, cycling in this case referring to alternate purge and ignition periods.

The embodiment of FIG. 3 also inherently protects against electrode short-circuits or grounding of either electrode. If either of the foregoing conditions obtain at any time, the capacitor 83 will not be able to store sufficient charge to prevent the silicon controlled switch 77 from firing, and as previously explained, once the switch 77 fires, the gas valve closes to prevent further gas supply to the burner. This feature of the circuit of FIG. 3 is effective at all times of circuit operation, including the purge, ignition and operating periods.

While I have described my invention with respect to the details of various embodiments thereof, many changes and variations will become apparent to those skilled in the art upon reading my description, and such can obviously be made without departing from the scope of my invention.

Having thus described my invention, what I claim is:

1. In combination, a pair of spaced ignition electrodes, a pulse transformer having a secondary winding connected in series with said electrodes and a primary winding, a pair of terminals adapted to be connected to a source of alternating voltage, a capacitor, half wave rectifying means connecting said terminals, said capacitor, and said primary winding in series to supply unipolar charging pulses to said capacitor when said terminals are excited by alternating voltage, an electronic switch connected across said terminals and in series with said capacitor and said primary winding and actuable to a conducting and a non-conducting state, means responsive to alternating voltage applied to said terminals for actuating said switch to its conducting state during half cycles of voltage when said capacitor is not being charged, flame detecting means responsive to fuel burning adjacent said electrodes to produce a signal, and switching means controlled by said flame detecting means for closing a circuit path when said signal is present.

2. The apparatus of claim 1, in which said flame detecting means comprises a thermally response resistor having a negative temperature characteristic and located in the vicinity of said electrodes to be heated by a flame ignited by said electrodes, and further comprising a circuit breaker comprising contacts and a current responsive impedance both connected in series with said terminals, and means connecting said resistor in parallel with the impedance of said circuit breaker to substantially reduce the current flowing through the impedance when the resistor is heated by a flame.

3. In a pulsed spark gas ignition system, the combination comprising a pair of electrodes defining a spark gap, pulse generating means for supplying spaced unipolar pulses of voltage to said electrodes to produce sparks across said gap, valve means actuable from a closed position to an open position to supply fuel to said gap in its open position, flame detecting means changed from a first state to a second state by fuel burning in the vicinity of the gap, and control means responsive to the supply of pulses to said electrodes for actuating said valve means to its open position upon the initiation of said pulses, and time delay means controlled by said flame detecting means in its first state for actuating said valve means to its closed position after a predetermined time sufficient to permit ignition following opening of said valve means if a flame has not been detected.

4. The apparatus of claim 3, in which said time delay means comprises a current responsive circuit breaker comprising an impedance and contacts, said pulse generating means comprises a circuit path including said impedance and said contacts for conducting current providing energy for said pulses, said circuit breaker being energized to open its contacts and disconnect said pulse generating means when said impedance conducts a predetermined current for a predetermined time, and said flame detecting means comprises a thermally responsive impedance in position to be heated by a flame ignited by said electrodes and having a negative temperature characteristic, said thermally responsive impedance being connected in parallel with the impedance of said circuit breaker and having an impedance when heated by a flame sufficiently low to prevent operation of said circuit breaker.

5. In combination, a gas burner, a fuel supply conduit connected between a source of combustible fuel and said burner, a valve in said conduit having open and closed positions, a solenoid connected to said valve and operable when energized to open said valve, a pulse transformer having a primary winding and a secondary winding, a pair of electrodes connected in series with said secondary winding and located adjacent said burner in spaced confronting relation, to form an ignition spark gap for igniting fuel supplied to said burner, first switching means actuable from a non-conducting to a conducting state by an applied voltage of a first polarity, a capacitor connected in series with said first switching means and the primary winding of said pulse transformer, a source of alternating voltage, second switching means actuable to a first and a second state, means controlled by said second switching means in its first state for applying voltage from said source to said solenoid, rectifying means for applying voltage of a polarity opposite said first polarity from said source across said capacitor and said primary winding in series to charge said capacitor, means for applying voltage from said source to said first switching means to actuate it to its conducting state on half-cycles of said source voltage following half-cycles in which said capacitor has been charged to discharge said capacitor through said primary winding and produce a spark across said gap, flame detecting means located adjacent said burner and changed from a first state to a second state by burning fuel from the burner, and means controlled by said flame detecting means in its first state for actuating said second switching means to its second state when a flame in said chamber is extinguished.

References Cited

UNITED STATES PATENTS 3,384,440   5/1968   Mayer _____ 431—66
3,393,038   7/1968   Burkhalter et al. _____ 431—66

EDWARD G. FAVORS, Primary Examiner